US006620355B1

(12) United States Patent
Schmidt

(10) Patent No.: US 6,620,355 B1
(45) Date of Patent: Sep. 16, 2003

(54) METHOD FOR COMPACTING AEROGELS

(75) Inventor: Marc Schmidt, Riedstadt (DE)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/430,982

(22) Filed: Nov. 1, 1999

Related U.S. Application Data

(63) Continuation of application No. PCT/EP98/02520, filed on Apr. 29, 1998, now abandoned.

(30) Foreign Application Priority Data

May 2, 1997 (DE) .......................................... 197 18 741

(51) Int. Cl.⁷ ............................................... B29C 67/20
(52) U.S. Cl. .......................... 264/41; 264/102; 264/109; 264/118; 264/122; 264/140
(58) Field of Search .......................... 264/41, 102, 109, 264/118, 122, 140

(56) References Cited

U.S. PATENT DOCUMENTS

| | | | |
|---|---|---|---|
| 2,093,454 A | 9/1937 | Kistler | |
| 2,541,137 A | 2/1951 | Warrick | |
| 2,680,696 A | 6/1954 | Broge | |
| 2,786,042 A | 3/1957 | Iler | |
| 2,886,460 A | 5/1959 | Alexander et al. | |
| 2,978,298 A | 4/1961 | Wetzel | |
| 3,015,645 A | 1/1962 | Tyler | |
| 3,024,126 A | 3/1962 | Brown | |
| 3,122,520 A | 2/1964 | Lentz | |
| 3,615,142 A | 10/1971 | Dahlbom | |
| 3,794,713 A | 2/1974 | Aboutboul | |
| 3,872,217 A | 3/1975 | Merz | |
| 4,101,442 A | 7/1978 | Rosen | |
| 4,101,443 A | 7/1978 | Rosen | |
| 4,190,457 A | 2/1980 | McDaniel | |
| 4,256,682 A * | 3/1981 | Denton ........................ 502/232 |
| 4,344,800 A | 8/1982 | Lutz | |
| 4,382,070 A | 5/1983 | Novak et al. | |
| 4,667,417 A | 5/1987 | Graser et al. | |
| 4,704,374 A | 11/1987 | Jacques | |
| 4,873,218 A | 10/1989 | Pekala | |
| 4,888,369 A | 12/1989 | Moore | |
| 4,906,676 A | 3/1990 | Ida | |
| 4,950,502 A | 8/1990 | Saam | |
| 5,001,183 A | 3/1991 | Sands | |
| 5,009,874 A | 4/1991 | Parmentier | |
| 5,069,815 A | 12/1991 | Aoki et al. | |
| 5,081,163 A | 1/1992 | Pekala | |
| 5,122,291 A | 6/1992 | Wolff et al. | |
| 5,215,733 A | 6/1993 | Potter | |
| 5,275,796 A | 1/1994 | Tillotson | |
| 5,294,480 A * | 3/1994 | Mielke et al. ................. 442/38 |
| 5,409,683 A | 4/1995 | Tillotson | |
| 5,455,216 A | 10/1995 | Mueller et al. | |
| 5,484,818 A | 1/1996 | De Vos | |
| 5,496,527 A | 3/1996 | Yokogawa | |
| 5,508,341 A | 4/1996 | Mayer | |
| 5,556,892 A | 9/1996 | Pekala | |
| 5,561,318 A | 10/1996 | Gnade | |
| 5,565,142 A | 10/1996 | Deshpande | |
| 5,595,593 A | 1/1997 | Burns | |
| 5,625,013 A | 4/1997 | Mueller et al. | |
| 5,651,921 A | 7/1997 | Kaijou | |
| 5,674,962 A | 10/1997 | Ito et al. | |
| 5,705,535 A | 1/1998 | Jansen | |
| 5,708,069 A | 1/1998 | Burns | |
| 5,731,360 A * | 3/1998 | Pekala et al. .................. 521/54 |
| 5,738,801 A | 4/1998 | Ziegler et al. | |
| 5,750,610 A | 5/1998 | Burns | |
| 5,759,506 A | 6/1998 | Jansen et al. | |
| 5,786,059 A | 7/1998 | Frank et al. | |
| 5,795,556 A | 8/1998 | Jansen et al. | |
| 5,811,031 A | 9/1998 | Jansen et al. | |
| 5,866,027 A | 2/1999 | Frank | |
| 5,888,425 A | 3/1999 | Schwertfeger | |
| 5,948,314 A | 9/1999 | Geiss et al. | |
| 6,040,375 A | 3/2000 | Behme et al. | |
| 6,080,475 A | 6/2000 | Frank et al. | |
| 6,129,949 A | 10/2000 | Schwertfeger et al. | |

FOREIGN PATENT DOCUMENTS

| | | |
|---|---|---|
| DE | 261 581 | 6/1913 |
| DE | 296 898 | 12/1915 |

(List continued on next page.)

OTHER PUBLICATIONS

Webster's Ninth New Collegiate Dictionary, pp. 267, 270 and 764 (1985).*

International Search Report—PCT/EP 98/02519, Sep. 10, 1998.

International Search Report—PCT/EP 97/06595, May 12, 1998.

International Search Report—PCT/EP 98/02283 (Undated).

EPO Search Report TS 68015, Feb. 24, 1998.

Gesser, H.D., *Chem.Rev.* 1989, 89, 765.

Kistler, S.S., *Nature*, 1931, 127, 741.

Ullmann's *Encyclopedia of Industrial Chemistry*, p. 630 (Undated).

Urbaniak, W., *React.Kinet.Catal.Lett.* 1987, 34, 129.

U.S.S.N. 09/231,356 (corresponding to WO 99/36356), filed Jan. 13, 1999.

(List continued on next page.)

*Primary Examiner*—Leo B. Tentoni

(57) ABSTRACT

A method of compacting aerogels into larger aerogel particles is disclosed. The method provides for molding small aerogel particles into larger aerogel particles and selecting a desired granular range of the molded aerogel particles. Additives, fillers, and binders may be added to the aerogel particles to achieve specific desired properties of the molded aerogel particles.

20 Claims, No Drawings

FOREIGN PATENT DOCUMENTS

| | | |
|---|---|---|
| DE | 296 898 | 3/1917 |
| DE | 896 189 | 11/1953 |
| DE | 1 667 078 | 5/1971 |
| DE | 2 103 243 | 8/1972 |
| DE | 3 025 437 | 4/1980 |
| DE | 3 329 016 | 2/1985 |
| DE | 261 581 | 11/1988 |
| DE | 43 42 548 | 12/1993 |
| DE | 44 04 701 | 2/1994 |
| DE | 44 37 424 | 10/1994 |
| DE | 43 16 540 | 11/1994 |
| DE | 195 06 141 | 2/1995 |
| DE | 195 41 279 | 6/1995 |
| DE | 195 34 198 | 9/1995 |
| DE | 195 41 715 | 9/1995 |
| DE | 195 41 992 | 10/1995 |
| DE | 195 37 821 | 11/1995 |
| DE | 196 31 267 | 2/1996 |
| DE | 44 30 669 | 3/1996 |
| DE | 195 02 453 | 9/1996 |
| DE | 196 48 798 | 11/1998 |
| EP | 0 031 166 | 7/1981 |
| EP | 0 171 722 | 2/1986 |
| EP | 0 199 930 | 11/1986 |
| EP | 0 396 076 | 4/1990 |
| EP | 0 552 484 A | 7/1993 |
| EP | 0 589 350 | 3/1994 |
| EP | 0 658 513 | 12/1994 |
| GB | 607234 | 8/1948 |
| GB | 682574 | 11/1952 |
| GB | 783868 | 10/1955 |
| SE | 528 298 | 1/1969 |
| WO | WO 92/03378 | 3/1992 |
| WO | WO 92/20623 | 11/1992 |
| WO | WO 94/22943 | 10/1994 |
| WO | WO 94/25149 | 11/1994 |
| WO | WO 95/03358 | 2/1995 |
| WO | WO 95/06617 | 3/1995 |
| WO | WO 96/06809 | 3/1996 |
| WO | WO 96/14266 | 5/1996 |
| WO | WO 96/15997 | 5/1996 |
| WO | WO 96/19607 | 6/1996 |
| WO | WO 96/22942 | 8/1996 |
| WO | WO 96/25850 | 8/1996 |
| WO | WO 96/25950 | 8/1996 |
| WO | WO 97/10187 A1 | 3/1997 |
| WO | WO 97/10187 | 3/1997 |
| WO | WO 97 10188 | 3/1997 |
| WO | WO 97/17287 | 5/1997 |
| WO | WO 97/17288 | 5/1997 |
| WO | WO 97/18161 | 5/1997 |
| WO | WO 98/05591 | 2/1998 |
| WO | WO 99/64504 | 12/1999 |

OTHER PUBLICATIONS

U.S.S.N. 09/231,366 (corresponding to WO 99/36358), filed Jan. 13, 1999.
U.S.S.N. 09/229,179 (corresponding to WO 99/36479), filed Jan. 13, 1999.
U.S.S.N. 09/229,275 (corresponding to WO 99/36480), filed Jan. 13, 1999.
U.S.S.N. 09/308,888 (corresponding to WO 98/23366), filed Dec. 9, 1999.
U.S.S.N. 09/433,931 (corresponding to WO 98/50144), filed Nov. 1, 1999.
U.S.S.N. 09/403,270 (corresponding to WO 98/47594), filed Oct. 18, 1999.
U.S.S.N. 09/447,030 (corresponding to WO 98/53905), filed Nov. 22, 1999.
U.S.S.N. 09/444,469 (corresponding to WO 98/53906), filed Nov. 22, 1999.
U.S.S.N. 09/578,665 (corresponding to WO 99/26880), filed May 25, 2000.
U.S.S.N. 09/594,000 (corresponding to WO 99,32218), filed Jun. 14, 2000.
U.S.S.N. 09/609,012 (corresponding to WO 99/36170), filed Jun. 29, 2000.
U.S.S.N. 09/607,099 (corresponding to WO 99/36354), filed Jun. 29, 2000.
U.S.S.N. 08/849,297, filed Aug. 13, 1997.
U.S.S.N. 08/836,935, filed May 21, 1997.
U.S.S.N. 08/981,802, filed Jan. 8, 1998.
*International Search Report—PCT/EP 98/02520, Sep. 11, 1998.*

* cited by examiner

METHOD FOR COMPACTING AEROGELS

This application is a continuation of international application No. PCT/EP98/02520, filed Apr. 29, 1998, now abandoned.

FIELD OF THE INVENTION

The object of the present invention is a method of compacting aerogels.

BACKGROUND

Aerogels, particularly those with a porosity above 60% and a density of less than 0.6 g/cu.cm display extremely low thermal conductivity and are therefore used as a heat insulating material, as is described in EP-A-0 171 722, as catalysts or as catalysts carriers and also as adsorption material. Furthermore, by virtue of their very low refraction index for solid substances, it is known to use them for Cerenkov detectors. Furthermore, by reason of their particular acoustic impedance, the literature describes a possible use as an impedance adaptation means, for example in the ultrasound range.

It is also possible for them to be used as carriers for effective substances in pharmacy or agriculture.

Aerogels in the broader sense, e.g. in the sense of "gel with air as the dispersion agent" are produced by the drying of a suitable gel. The term "aerogel" in this sense embraces aerogels in the narrower sense, xerogels and cryogels. In this respect, a dried gel is termed an aerogel in the narrower sense when the liquid of the gel is eliminated at above critical temperature and starting from pressures above critical pressure. On the other hand, if the liquid is eliminated from the gel under sub-critical conditions, for example with the formation of a liquid/vapor interphase, then the resulting gel is frequently referred to also as a xerogel.

When the term aerogels is used in the present invention, these are aerogels in the broader sense, i.e. in the sense of "gel with air as the dispersion medium"

The term does not include aerogels known from earlier literature and which are obtained for example by precipitation of silicic acid (e.g. DE 3025437, DD 296 898) or which occur as pyrogenic silicic acid, e g. Aerosil™. In these cases, during manufacture, no three-dimensional gel lattice develops which is homogeneous over relatively great distances Where aerogels are concerned, it is possible basically to differentiate between inorganic and organic aerogels.

Inorganic aerogels have already been known since 1931 (S. S. Kistler, Nature 1931, 127, 741). Since then, aerogels have been forthcoming from various starting materials. In this respect, for example $SiO_2$-, $Al_2O_3$-, $TiO_2$-, $ZrO_2$-, $SnO_2$-, $Li_2O$-, $CeO_2$-, $V_2O_6$-aerogels and mixtures of these were produced (H. D. Gesser, P. C. Goswami, Chem. Rev. 1989, 89, 765 el seq).

For some years, organic aerogels have also been known which are derived from the most widely diverse starting materials, e.g. melamine formaldehyde (R. W. Pekala, J. Maier, Sci. 1989, 24, 3221).

Inorganic aerogels can thereby be produced in different ways.

On the one hand, $SiO_2$ aerogels can for example be produced by acid hydrolysis and condensation of tetra-erbyl orthosilicate in ethanol. During this process, a gel is produced which can be dried by super-critical drying while its structure is maintained. Production methods based on this drying technique are known for example from EP-A-0 396 076, WO 92/03378 or WO 95/06617

The high pressure technique involved in the super-critical drying of aerogels in however an expensive process and involves a high security risk. In addition, however, super-critical drying of aerogels is a very cost-intensive production method An alternative to super-critical drying is afforded by a method for the sub-critical drying of $SiO_2$ gels.

The costs involved in sub-critical drying are substantially less by reason of the simpler technology, the lower energy costs and the lesser security risk.

The $SiO_2$ gels can for example be obtained by acid hydrolysis of tetra-alkoxy silanes in a suitable organic solvent by means of water. Once the solvent has been exchanged for a suitable organic solvent, the gel obtained is in a further step reacted with a silylating agent. The $SiO_2$ gel resulting from this can then, from an organic solvent, be dried in air. Thus, aerogels with densities of less than 0.4 g/cu.cm and porosities above 60% can be achieved. The production method based on this drying technique is described in detail in WO 94/25149

Furthermore, the above-described gels can, prior to drying and in the alcohol-aqueous solution, be mixed with tetra-alkoxy silanes and aged, in order to increase the gel lattice strength, as disclosed in WO 92/20623.

The tetra-alkoxy silanes used as starting materials in the above-described processes do, however, likewise represent an extremely high cost factor.

A not inconsiderable cost reduction can be achieved by using water-glass as a starting material for the production of $SiO_2$ gels To this end, it is possible for example to produce a silicic acid from an aqueous water-glass solution with the help of an ion exchange resin, the silicic acid then being polycondensed by the addition of a base to produce an $SiO_2$ gel. After exchange of the aqueous medium for a suitable organic solvent, it is then possible in a further step to react the resulting gel with a silylating agent containing chlorine. The $SiO_2$ gel which is surface modified for example with methyl silyl groups can then and likewise from an organic solvent, be dried in air The production method based on this technique is known from DE-A-43 42 548

Alternative methods with regard to the production of an $SiO_2$ aerogel on a basis of water-glass with subsequent sub-critical drying are described in German Patent Application 195 41 715.1 and 195 41 992.8

Furthermore, DE-A-195 02 453 describes a use of chlorine-free silylating agents during the production of sub-critically dried aerogels.

Furthermore, an organofunctionalisation by means of organofunctionalised silylating agents in the production of sub-critically dried aerogels is described in DE-A-195 34 198.

However, on grounds of procedural technology and manufacturing costs, the production of aerogel particles on a major industrial scale is limited to particle sizes less than 5 mm and preferably less than 2 mm.

According to the particular manner of producing the aerogels, so in principle a plurality of washing and solvent exchange stages are required. Since these are diffusion-dependent, the time required is increased by the square of the radius of the gel particles. Consequently, apart from the drying method, the costs of aerogel production also increase quite considerably from the particle size upwards. On grounds of cost, the result is an endeavour to produce the smallest possible aerogel particles.

On the other hand, the handling of very small particles is very complicated and thus the costs entailed are likewise unfavourable and not every industrial application of aerogels is independent of the particle size.

Therefore, from the point of view of handling and for many applications, larger aerogel particles are needed or at least advantageous.

SUMMARY

Therefore, the object of the present invention is to provide a method by which small aerogel particles of less than 2 mm can be formed into larger aerogel particles.

DETAILED DESCRIPTION

This problem is resolved by a method in which the areogel particles are delivered to a moulding apparatus in which they are compressed. In this way, it is particularly simple to form small aerogel particles into larger aerogel particles.

Advantageously, in order to achieve specific desired properties of the aerogel particles, additives, fillers and/or binders are added to the aerogel particles and may be in the form of particles and/or fibres or may possibly also be liquid or in paste form.

In accordance with a preferred embodiment, the starting material is degassed prior to moulding. This advantageous particularly when the starting material is in loose bulk form, since then a certain proportion of the gas present between the aerogel particles has to be removed prior to compacting.

Expediently, the starting material is subjected to a negative pressure for degassing, whereby, according to another embodiment, degassing can also take place during the moulding.

The aerogel particles or the starting material can be molded into the form of granulate, after which they are then advantageously separated according to their size. For example, this can happen by screening off the desired ranges of granular size in order to arrive at the desired target fraction. Granulate which is below the desired granular range is advantageously recycled to moulding apparatus while granulate which is above the desired range is ideally comminuted so that it comes into the desired granular range. However, after comminution it can also be fed back directly to the moulding apparatus to be compacted once again.

Prior to further processing, the granulate is then, in accordance with another embodiment, dried in order to remove any residual humidity which is undesirable or harmful to further processing.

However, the starting material can also be moulded to produce a scab, in which case this is then likewise and in accordance with a further embodiment, dried prior to any further procedural step.

Moulding of the aerogel particles or aerogel particles with possible additives can take place using conventional and suitable moulding apparatus.

In accordance with a further embodiment, the starting material was moulded in a female die by means of a male die. The mouldings produced in this way can then possibly be cut by a knife, a scraper or the like to reduce them to the desired size.

Another embodiment envisages the starting material being moulded between a female die and a roller which slides or rolls over it. In this case, the female die may be performed in which case, the mouldings produced are advantageously, on the output side, cut to the desired size by means of a knife, a scraper or the like According to a preferred embodiment, the starting material is moulded between two rollers of which at least one but preferably both rotate. Expediently, the starting material is then pressed into the roller gap by a tamping screw.

In accordance with a further development of this embodiment, at least one of the rollers is constructed as a perforated hollow roller. The mouldings produced in this case by moulding are advantageously cut to the desired size on the output side by some suitable device, for example a knife or a scraper.

Another further development envisages at least one of the rollers being profiled. By a suitable selection of the profiles, the starting material can then be moulded directly either into the form of granules or into some cohesive product strip, a so-called scab.

What is claimed is:

1. A method of compacting aerogel particles, comprising feeding aerogel particles into a molding apparatus and molding the aerogel particles in the molding apparatus, wherein the aerogel particles are degassed prior to and/or during molding.

2. The method of claim 1, wherein additives, fillers, and/or binders are added to aerogel particles.

3. A method according to claim 2, characterised in that the components are in particulate or fibre form.

4. A method according to claim 2, characterised in that the components are liquid or pasty.

5. A method according to claim 1, characterised in that the starting material is subjected to a negative pressure.

6. A method of compacting aerogel particles, comprising feeding the aerogel particles into a molding apparatus and molding the aerogel particles into granules in the molding apparatus, wherein the granules are sorted according to their size.

7. The method of claim 6, wherein the granules which are below the desired granular range, are returned to the molding apparatus.

8. The method of claim 6, wherein the granules which are above the desired granular range, are comminuted.

9. The method of claim 6, wherein the granules are dried prior to further processing.

10. The method of claim 1, wherein the aerogel particles are molded into a scab.

11. A method of compacting aerogel particles, comprising feeding the aerogel particles into a molding apparatus and molding the aerogel particles into a scab, wherein the scab is dried prior to further processing.

12. The method of claim 6, wherein a male die molds the aerogel particles in a female die.

13. A method of compacting aerogel particles, comprising feeding the aerogel particles into a molding apparatus and molding the aerogel particles into granules in the molding apparatus, wherein the aerogel particles are molded between a roller and a female die.

14. A method of compacting aerogel particles, comprising feeding the aerogel particles into a molding apparatus and molding the aerogel particles into granules in the molding apparatus, wherein the molding apparatus comprises a perforated female die and moldings that are cut off on an output side of the molding apparatus.

15. A method of compacting aerogel particles, comprising feeding the aerogel particles into a molding apparatus and molding the aerogel particles into granules in the molding apparatus, wherein the aerogel particles are molded between two rollers.

16. A method of compacting aerogel particles, comprising feeding the aerogel particles into a molding apparatus having an output side and molding the aerogel particles into granules in the molding apparatus, wherein the aerogel particles are molded between two rollers, at least one of which is a perforated hollow roller, the moldings being cut off on the output side.

17. A method of compacting aerogel particles, comprising feeding the aerogel particles into a molding apparatus and molding the aerogel particles into granules in the molding apparatus, wherein the aerogel particles are molded between two rollers, at least one of which is profiled.

18. A method of compacting aerogel particles, comprising the steps of: feeding a starting material comprising aerogel particles into a molding apparatus; compressing the aerogel particles into larger aerogel particles; and separating smaller aerogel particles from the larger aerogel particles.

19. A method of compacting aerogel particles, wherein the aerogel particles are reacted with a silating agent and are fed into and molded in a molding apparatus.

20. A method of compacting an aerogel, comprising: forming gel particles, reacting the gel particles with a silylating agent, drying the gel particles to produce aerogel particles, and feeding the aerogel particles into a molding apparatus and molding the aerogel particles.

* * * * *